United States Patent [19]
Schoenfeld et al.

[11] Patent Number: 6,143,379
[45] Date of Patent: Nov. 7, 2000

[54] POLYMER LAMINATES HAVING INCREASED HIDING POWER

[75] Inventors: Axel Schoenfeld, Wiesbaden; Bernd Dewald, Idstein, both of Germany

[73] Assignee: Clariant GmbH, Frankfurt, Germany

[21] Appl. No.: 09/061,779

[22] Filed: Apr. 16, 1998

[30] Foreign Application Priority Data

Apr. 17, 1997 [DE] Germany ............................ 197 15 993

[51] Int. Cl.⁷ .................................................. C09K 19/00
[52] U.S. Cl. ........................... 428/1.1; 349/110; 349/187; 349/193; 428/1.31; 428/1.5; 428/1.51; 428/1.52
[58] Field of Search ..................................... 428/1.1, 1.31, 428/1.5, 1.51, 1.52; 349/110, 187, 193

[56] References Cited

U.S. PATENT DOCUMENTS

| | | | |
|---|---|---|---|
| 5,834,064 | 11/1998 | Dietz et al. | 427/388.1 |
| 5,837,160 | 11/1998 | Dietz et al. | 252/299.01 |

FOREIGN PATENT DOCUMENTS

| | | |
|---|---|---|
| 0 391 368 A1 | 10/1990 | European Pat. Off. . |
| 44 16 191 A1 | 11/1995 | Germany . |
| 44 18 075 A1 | 11/1995 | Germany . |
| 19612975 | 10/1997 | Germany . |
| 19619973 | 11/1997 | Germany . |
| 19620746 | 11/1997 | Germany . |
| 2276883 | 10/1994 | United Kingdom . |
| 2282145 | 3/1995 | United Kingdom . |

OTHER PUBLICATIONS

European Search Report.
Derwent Patent Family Report and/or Abstract.

*Primary Examiner*—Nasser Ahmad
*Attorney, Agent, or Firm*—Susan S. Jackson; Scott E. Hanf

[57] ABSTRACT

A polymer laminate essentially consisting of at least two cholesteric, liquid-crystalline polymer layers and a light-absorbent layer in between is suitable as starting material for effect pigments having a color impression which is dependent on the viewing angle.

12 Claims, No Drawings

POLYMER LAMINATES HAVING INCREASED HIDING POWER

The invention relates to polymer laminates having a bright color impression which is dependent on the viewing angle.

Cholesteric liquid-crystal polymers are distinguished by a helical superstructure. This results firstly in the material no longer having the anisotropy of the mechanical properties which is usual in nematic liquid-crystal polymers. Secondly, the material exhibits pronounced color effects. The color appearance of such liquid-crystalline compounds is due to selective reflection at the helix of the cholesteric structure. The only wavelength of the incident light that is reflected is the one which corresponds to the pitch of the helical superstructure of the liquid-crystalline compound, whereas the light components having other wavelengths pass through the liquid-crystalline polymer film and are absorbed by a dark substrate. Liquid-crystal polymer films aligned in this way have a certain color, when viewed orthogonally, which shifts continuously to shorter-wave colors at an inclined viewing direction. This color appearance of the surface, which is dependent on the viewing angle, gives the films a very effective appearance which is highly desirable for certain applications. However, a disadvantage is the transparency of the liquid-crystalline polymer films for wavelengths which are not selectively reflected. It is therefore necessary to have an absorbent, preferably black, substrate in order to allow the selective reflection to become the dominant color appearance.

In selective reflection at the helical superstructure of the liquid-crystal polymers, only one polarization direction of light is reflected. In the case of a right-handed helix, for example, right-handed circular-polarized light is reflected, while the left-handed circular-polarized component is transmitted and, where appropriate, absorbed by the black substrate. This means that liquid-crystalline polymer films of this type can only reflect a maximum of 50% of the incident light having the wavelength in question.

It is possible to use liquid-crystalline polymer films to produce transparent pigments having an optically variable color impression (DE 44 16 191 A1; DE 44 18 075 A1). To this end, the aligned liquid-crystal films are crosslinked and then ground to give small platelets. For use of these pigments, their transparency means that a dark substrate is always necessary. It is disadvantageous that this requires an additional process step and is associated with costs.

The object of the present invention was therefore to develop liquid-crystalline pigments having good hiding power and a bright color impression which is dependent on the viewing angle and which overcome said disadvantages of the prior art.

SUMMARY OF THE INVENTION

It has been found that the liquid-crystalline polymer laminates having an absorbent middle layer surprisingly achieve this object.

The present invention relates to a polymer laminate essentially consisting of at least two cholesteric, liquid-crystalline polymer layers and a light-absorbent layer in between.

In order to achieve the novel effect, it is necessary for the light-absorbent layer to form the middle layer of an (at least) three-layer structure. This middle layer is covered on both sides by a cholesteric liquid-crystal polymer layer. A laminate of this type appears opaque from both sides owing to the absorbent middle layer. It is in principle possible for the novel polymer laminate to contain more than only two transparent, cholesteric, liquid-crystal polymer layers. It may furthermore be advantageous to provide the laminate on one or both sides with a transparent clear coating, which need not be liquid-crystalline.

Suitable clear coats are in principle all known clear coats or transparently pigmented coating compositions. It is possible to use here both solvent-containing one-component or two-component coatings and, preferably, water-thinnable clear coatings and powder coatings. In some cases, it may be advantageous to choose a somewhat thicker clear coat or to apply 2 clear coats of the same or different liquid or powder clear coatings. The clear coating, as is known, contains further auxiliaries which improve the surface properties of the coated objects. Mention may be made, for example, of UV stabilizers and light stabilizers, which protect the underlying layers against degradation reactions.

The overall layer thickness of the novel polymer laminate is in the range from 0.5 $\mu$m to 100 $\mu$m, preferably from 1 $\mu$m to 25 $\mu$m, in particular from 3 $\mu$m to 15 $\mu$m. Depending on the desired application, however, layer thicknesses which differ therefrom may also be advantageous. It is advantageous for the transparent, cholesteric, liquid-crystal polymer layers to have a comparable layer thickness.

The polymers employed to form the cholesteric, liquid-crystal polymer layers can be either uncrosslinked polymers or polymer networks having a cholesteric liquid-crystal phase.

Examples of uncrosslinked polymers are cholesteric main-chain polymers, cholesteric side-group polymers or combined main-chain/side-group polymers. Polymer networks can be produced either from crosslinkable polymers or alternatively from crosslinkable low-molecular-weight or oligomeric compounds by crosslinking in the film.

Preferred polymers for building up the liquid-crystal layers are, for example, polysiloxanes, polyvinyl ethers, polyepoxides, polyacrylates or polymethacrylates containing mesogens in the side group, the side-group polymers described in DE 44 16 191 A1 and DE 44 18 075 A1, in particular containing phenyl acryloyloxyalkyloxybenzoates as the achiral component and cholesterylacryloyloxyalkyloxybenzoates as the chiral component, and cholesteric main-chain polymers. The cholesteric main-chain polymers are generally prepared from a chiral component and from hydroxycarboxylic acids, aminocarboxylic acids and/or a combination of dicarboxylic acids and diols or diamines. In general, the main-chain polymers essentially consist of aromatic constituents. However, it is also possible to employ aliphatic and cycloaliphatic components, such as, for example, cyclohexanedicarboxylic acid.

For the purposes of the present invention, particular preference is given to cholesteric, liquid-crystalline main-chain polymers consisting of a) from 0 to 99.9 mol % of at least one compound from the group consisting of aromatic hydroxycarboxylic acids, cycloaliphatic hydroxycarboxylic acids and aromatic aminocarboxylic acids;

b) from 0 to 49.95 mol % of at least one compound from the group consisting of aromatic dicarboxylic acids and cycloaliphatic dicarboxylic acids;

c) from 0 to 49.95 mol % of at least one compound from the group consisting of aromatic diols, cycloaliphatic diols, aromatic diamines and aromatic hydroxyamines;

d) from 0.1 to 40 mol %, preferably from 1 to 25 mol %, of chiral, bifunctional comonomers, and e) from 0 to 5 mol % of a branchable component containing more than two functional groups, where the sum is 100 mol %.

Examples of particularly suitable hydroxycarboxylic acids are hydroxybenzoic acids, such as 3-hydroxy- or 4-hydroxybenzoic acid, hydroxynaphthalenecarboxylic acids, such as for example, 2-hydroxy-7-carboxybapthalene or 2-hydroxy-6-carboxynapthalene, hydroxybiphenylcarboxylic acids and hydroxycinnamic acids, such as, for example, 3-hydroxy- or 4-hydroxycinnamic acid.

Examples of particularly suitable aminocarboxylic acids are 3-amino- or 4-aminobenzoic acid.

Examples of particularly suitable dicarboxylic acids are terephthalic acid, isophthalic acid, biphenyldicarboxylic acids, naphthalenedicarboxylic acids, cyclohexanedicarboxylic acids, pyridinedicarboxylic acids, oxybis (benzenecarboxylic acids) and carboxycinnamic acids.

Particularly suitable diols, aminophenols and diamines are hydroquinones, dihydroxybiphenyls, such as 4,4-dihydroxybiphenyl, napthalenediols, such as 2,6- or 2,7-naphthalenediol, dihydroxydiphenyl sulfones, dihydroxydiphenyl ethers, dihydroxyterphenyls, dihydroxydiphenyl ketones, m- and p-phenylenediamine, diaminoanthraquinones, dihydroxyanthraquninones, m- and p-aminophenol and aminonaphthol.

The functional groups of the abovementioned compounds are preferably not in the ortho-position to one another.

Particularly suitable chiral, bifunctional monomers are isosorbide, isomannide, isoiditol, camphoric acid, (D)- or (L)-methylpiperazine, (D)- or (L)-3-methyladipic acid, butane-2,3-diol and bifunctional derivatives of tartaric acid, such as, for example, (−)-2,3-O-isopropylidene-D-threitol or dimethyl (−)-2,3-O-isopropylidene-L-tartrate.

Regarding the above percentages, it must be ensured that the functional group stoichiometry known to the person skilled in the art for the polycondensation is ensured.

In addition, the polymers can also contain components having more than two functional groups, such as, for example, dihydroxybenzoic acids, trihydroxybenzenes or trimellitic acids. These components act as branching points in the polymer and should only be added in low concentrations, for example from 0 to 5 mol %.

For building up a cholesteric liquid-crystal polymer layer, a blend of two or more cholesteric, liquid-crystalline polymers which behaves like a one-component system is also suitable. A blend of this type can be prepared, for example, by joint extrusion or joint dissolution in a solvent.

The cholesteric, liquid-crystalline polymers can be prepared by conventional polycondensation processes, for example, melt condensation with acetic anhydride, as described, for example, in EP-A-0 391 368, at temperatures of from 120 to 350° C.

In order to obtain bright color effects, it is necessary to employ liquid-crystal polymers whose helix results in reflection in the visible region. However, it may also be advantageous for certain applications—for example for coding which is invisible to the human eye—to employ liquid-crystal polymers whose helix results in reflection of light outside the visible spectrum.

The absorbent middle layer in the polymer laminate need not necessarily consist of a polymer and furthermore need not be or contain a liquid crystal. For example, it is possible for the middle layer to consist of a colorant, carbon black, platelet-shaped graphite particles or a colored polymer. The content of the substance forming the absorbent middle layer in the polymer laminate is at advantageously from 1 to 95% by weight, preferably from 3 to 90% by weight.

The color of the laminate can also be influenced by selecting a hue other than black, for example, blue, red or green, as the absorbent middle layer. Use of non-black colorants results in a color flop, as observed in transparent liquid-crystal pigments when applied to colored substrates.

It must be ensured that there is good adhesion between the absorbent middle layer and the adjacent liquid-crystal polymer layers in order to prevent delamination. If adhesion is inadequate, the additional insertion of interlayers of high adhesion may be advantageous, for example by means of a polyvinyl acetate layer or other adhesion polymers known to the person skilled in the art.

The present invention also relates to a process for the production of a polymer laminate, wherein the respective layers are applied successively, if appropriate with interim drying or crosslinking, to a planar substrate and are then detached.

Cholesteric liquid-crystal polymers dissolved in a solvent can be knife-coated successively, for example, onto the planar substrate, for example a foil, glass sheet, paper or metal belt, where, after drying of the first layer, the light-absorbent second layer and, if necessary after drying thereof, then the third layer is applied. The absorbent particles necessary to form the absorbent second layer can be, for example, sprayed on or applied as a thin coating film. The special optical properties of the novel effect coatings are only observed if the molecules form the helical structure above the chiralization temperature of the polymer. The transition to the cholesteric phase in many cases already takes place during synthesis of the polymers. Selective reflection wavelengths of the CLCPs employed in accordance with the invention is determined by the pitch of the helical structure. The pitch is dependent on the structure of the polymer, the melt viscosity, the presence of solvents and in particular on the helical twisting power of the chiral monomer. It is also a function of temperature. Correspondingly, the pitch of the helix can also be adjusted via the temperature. Rapid cooling of the laminates allows the pitch of the helix, and thus the selective reflection, to be permanently frozen in. Coloristic changes must be expected during slow cooling. In general, colored substrates are also obtained in this way. However, it is difficult to determine the final color characteristics in advance. If the cooled laminate is re-heated, the helix pitch obtained, and thus the selective reflection wavelength, is either new or the same. This operation can be used to vary and correct the color characteristics of the coated substrate. For use in practice, it is important that the melting point and chiralization temperature of the polymer are above the service temperature of the coated substrate.

In the case of crosslinkable, cholesteric, liquid-crystal polymers, the layers can be built up, for example, by first applying the first liquid-crystal polymer layer, crosslinking same, applying the middle layer and finally applying a further liquid-crystal polymer layer, which is also crosslinked again. The crosslinking can be initiated, for example, by UV irradiation.

The novel polymer laminate is particularly preferably produced by a process in which firstly, as described above, the first layer is produced, and a cholesteric, liquid-crystal polymer solution in which the absorbent particles are dispersed is then applied. After this solution has been applied, the absorbent particles are decomposed and automatically form, on drying of the film, the requisite middle layer without a separate process step being necessary.

The novel polymer laminate is particularly preferably produced by a process in which thermoplastic, cholesteric, liquid-crystal polymers are coextruded in at least two polymer layers and a light-absorbent layer in between, possibly with a further polymer as support layer.

Owing to their bright color effects, the novel polymer laminates are suitable as starting material for the preparation of viewing-angle-dependent effect pigments. To this end, the polymer laminate is comminuted to the desired platelet size using conventional comminution equipment. It should be ensured here that a platelet-shaped geometry is always present, i.e. a platelet diameter which is at least two to three times as large as a platelet thickness should be present.

Effect pigments based on the novel polymer laminates can be employed, for example, for painting natural or synthetic materials, for example wood, plastics, metal or glass, but in particular the body or body parts of motor vehicles.

The effect pigments prepared in accordance with the invention are suitable as colorants in electrophotographic toners and developers, such as, for example, one-or two-component powder toners (also referred to as one- or two-component developers), magnetic toners, liquid toners, polymerization toners and special toners (literature: L. B. Schein, "Electrophotography and Development Physics", Springer Series in Electrophysics 14, Springer Verlag, 2nd Edition, 1992).

Typical toner binders are polymerization, polyaddition and polycondensation resins, such as styrene, styrene-acrylate, styrene-butadiene, acrylate, polyester and phenol-epoxide resins, polysulfones, polyurethanes, individually or in combination, and polyethylene and polypropylene, which may also contain further constituents, such as charge-control agents, waxes or flow-control agents, or are subsequently modified by means of these additives.

Furthermore, the effect pigments prepared in accordance with the invention are suitable as colorants in triboelectrically or electrokinetically sprayable powder coatings, which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Typical powder-coating resins are epoxy resins, carboxyl- and hydroxyl-containing polyester resins, polyurethane resins and acrylic resins, together with conventional curing agents. Combinations of resins are also used. For example, epoxy resins are frequently used in combination with carboxyl- and hydroxyl-containing polyester resins. Typical curing components (depending on the resin system) are, for example, acid anhydrides, imidazoles and dicyandiamide, and derivatives thereof, masked isocyanates, bisacrylurethanes, phenolic and melamin resins, triglycidyl isocyanurates, oxazolines and dicarboxylic acids.

The effect pigments prepared in accordance with the invention are also suitable as colorants in aqueous and nonaqueous ink-jet inks and in inks which work on the hot-melt process.

DETAILED DESCRIPTION

In the examples below, parts are by weight.

Examples for the preparation of the cholesteric liquid-crystal polymers:

EXAMPLE A 20,317 parts of 2-hydroxy-6-naphthalic acid, 39,778 parts of 4-hydroxy-benzoic acid, 21,228 parts of 4,4'-dihydroxybiphenyl and 18,022 parts of (1R,3S)-(+)-camphoric acid are mixed in a reactor with 62,914 parts of acetic anhydride and 130 parts of potassium acetate, and a gentle stream of nitrogen is passed through the mixture. The mixture is heated to 150° C. over the course of 15 minutes and held at this temperature for 30 minutes. The temperature is then increased to 330° C. over the course of 330 minutes, and the melt is held at this temperature for 80 minutes. Acetic acid begins to distill off from about 220° C. The nitrogen flushing is then terminated, and a vacuum is applied. The melt is stirred in vacuo (about 5 mbar) for a further 30 minutes. The polymer is then aerated with nitrogen, cooled and isolated. When viewed perpendicularly, the polymer exhibits a bright yellowish green color which appears blue at an oblique viewing angle.

EXAMPLE B 20,317 parts of 2-hydroxy-6-naphthalic acid, 39,778 parts of 4-hydroxy-benzoic acid, 20,424 parts of 4,4'-dihydroxybiphenyl and 18,993 parts of (1R,3S)-(+)-camphoric acid are mixed in a reactor with 62,914 parts of acetic anhydride and 30 parts of potassium acetate, and a gentle stream of nitrogen is passed through the mixture. The mixture is heated to 150° C. over the course of 15 minutes and held at this temperature for 30 minutes. The temperature is then increased to 325° C. over the course of 270 minutes, and the melt is held at this temperature for 30 minutes. Acetic acid begins to distill off from about 220° C. The nitrogen flushing is then terminated, and a vacuum is applied within 120 minutes. The melt is stirred in vacuo (about 5 mbar) for a further 15 minutes. The polymer is then aerated with nitrogen, cooled and isolated. When viewed perpendicularly, the polymer exhibits a bright reddish gold color which appears greenish yellow at an oblique viewing angle.

EXAMPLE C 18 mol of 2-hydroxy-6-naphthalic acid, 48 mol of 4-hydroxy-benzoic acid, 17 mol of 4,4'-dihydroxybiphenyl and 17 mol of camphoric acid are mixed in a reactor with 103 mol of acetic anhydride, and a gentle stream of nitrogen is passed through the mixture. The mixture is heated to 140° C. over the course of 15 minutes with stirring and held at this temperature for 30 minutes. The temperature is then increased to 325° C. over the course of 165 minutes, and the melt is held at this temperature for 30 minutes with further stirring. Acetic acid begins to distill off from about 220° C. The nitrogen flushing is then terminated, and a vacuum is applied slowly. The melt is stirred in vacuo (about 5 mbar) for a further 30 minutes. The polymer is then aerated with nitrogen, extruded and pelletized.

The polymer exhibits a bright yellowish green color which appears blue when viewed obliquely. The color already arises during the condensation in vacuo and is retained after cooling.

Examples of the production of the novel polymer laminates

EXAMPLE 1

A 15% strength by weight solution of the cholesteric liquid-crystal polymer from Example A in N-methylpyrrolidone is applied to a polyimide foil by means of a hand coater No. 3 to give a 24 $\mu$m thick film, which is dried at 80° C. in a vacuum drying cabinet. The film thickness after drying is 3.6 $\mu$m. A second layer of the same thickness is then applied using a 15% strength by weight solution of the same cholesteric liquid-crystal polymer in which a further 1.5% by weight of carbon black has been incorporated by dispersion for 10 minutes at 13,500 rpm using an Ultra-Turrax. After drying, a third layer corresponding to the first is applied and dried, giving a three-layer laminate having a total layer thickness of about 10–11 µm. In order to develop the color, the laminate is heated for 5 minutes at 280° C. in an oven, giving a laminate which exhibits a bright yellowish green color when viewed perpendicularly on a white or black background and appears blue at an oblique viewing angle.

EXAMPLE 2

A 15% strength by weight dispersion of the cholesteric liquid-crystal polymer from Example C (particle size $D_{50}$= 6–10 µm) in isobutanol is applied to an aluminum foil using a knife coater with a gap width of 24 µm. After the dispersion coating has been dried, the coated aluminum foil is drawn over a hot metal surface, thus forming the lower liquid-crystal polymer layer. The residence time on the hot surface is 3–5 seconds at a surface temperature of 350° C. The film exhibits a green color which appears blue when viewed obliquely. The CLCP layer is formed extremely well and is homogeneous. The layer thickness is 3–5 µm. A 1% strength by weight dispersion of platelet-shaped graphite particles (for example Graphitan 7700®, commercially available from Ciba SC) in 2% aqueous carboxymethylcellulose (Tylose H200X®, commercially available from Clariant) is applied to this layer having a 24 µm knife coater and dried. The 15% strength by weight dispersion of the cholesteric liquid-crystal polymer is then again applied by means of a 24 µm knife coater, and, after drying, the upper liquid-crystal polymer layer is produced by drawing the film over a metal surface having a surface temperature of 350° C. at a mean residence time of 3–5 seconds. By means of the middle, light-absorbent Graphitan layer, an opaque polymer film is obtained which appears dark-green when viewed perpendicularly and dark-blue when viewed obliquely. The total layer thickness is 7–12 µm.

In order to prepare the effect pigment, the CLCP-coated aluminum foil is placed in semiconcentrated hydrochloric acid, dissolving the aluminum support foil and leaving the cholesteric polymer film. The polymer particles are ground in a universal mill. In order to narrow the particle-size distribution, the ground material is sieved through a sieve having a mesh width of 63 µm. The effect pigment obtained is incorporated into a 2-component clear coating, sprayed onto a metal sheet and covered with clear coating. After baking, the coating exhibits a dark-green color which appears dark-blue when viewed obliquely.

EXAMPLE 3

The CLCP composite comprising three layers is produced as described in Example 2. However, the middle layer is produced by applying a 1% strength by weight dispersion of platelet-shaped pigment particles, for example ®Iriodin Super Russet (obtainable from Merck) in a 2% aqueous carboxymethylcellulose (Tylose H200X®, commercially available from Clariant) using a 24 µm knife coater and dried. By means of the middle Iriodin layer, a polymer film is obtained which appears reddish green when viewed perpendicularly, reddish when viewed obliquely in the light direction and violet when viewed obliquely against the light direction. The total layer thickness is 7–12 µm.

The effect pigment is prepared as described in Example 2. However, the aluminum foil is dissolved in semiconcentrated sodium hydroxide solution. After baking in the coating, the middle Iriodin layer means that the effect pigment appears reddish green when viewed perpendicularly, reddish when viewed obliquely in the light direction and violet when viewed obliquely against the light direction.

EXAMPLE 4

The CLCP composite comprising three layers is produced as described in Example 2, but using a polyimide film, for example Kapton®, as support film. In order to produce the middle layer, a 1% strength by weight dispersion of an aluminum paste, for example Stapa Metallux 2196®, in 2% aqueous carboxymethylcellulose (Tylose H200X®, commercially available from Clariant) is applied by means of a 24 µm knife coater and dried. The middle layer containing aluminum particles gives the polymer film a metallic effect which appears green when viewed perpendicularly and blue when viewed obliquely. The total layer thickness is 13–16 µm. In order to prepare the effect pigment, the support film is passed over a deflection roll of small diameter, causing the cholesteric polymer film to delaminate. The polymer particles are ground in a universal mill. In order to narrow the particle-size distribution, the ground material is sieved through a sieve having a mesh width of 63 µm. The effect pigment obtained is incorporated into a 2-component clear coating, sprayed onto a black-primed metal sheet and covered with clear coating. After baking, the coating exhibits a metallic green color which appears blue when viewed obliquely.

What is claimed is:

1. A polymer laminate consisting essentially of at least two cholesteric, liquid-crystalline polymer layers and a light-absorbent layer in between wherein the liquid-crystalline polymer of the liquid-crystalline polymer layers are main-chain polymers and the main-chain polymers consist of:
   a) from 0 to 99.9 mol % of at least one compound selected from the group consisting of aromatic hydroxycarboxylic acids, cycloaliphatic hydroxycarboxylic acids and aromatic aminocarboxylic acids;
   b) from 0 to 49.95 mol % of at least one compound selected from the group; consisting of aromatic dicarboxylic acids and cycloaliphatic dicarboxylic acids;
   c) from 0 to 49.95 mol % of at least one compound selected from the group consisting of aromatic diols, cycloaliphatic diols, aromatic diamines and aromatic hydroxyamines;
   d) from 0.1 to 40 mol % of chiral, bifunctional comonomers, and
   e) from 0 to 5 mol % of a branchable component containing more than two functional groups, where the sum is 100 mol %.

2. A polymer laminate as claimed in claim 1, wherein the light-absorbent layer is the middle layer of a three-layer structure.

3. A polymer laminate as claimed in claim 1, which is covered on one or both sides by a transparent clear coating.

4. A polymer laminate as claimed in claim 1, which has a total thickness of from 0.5 to 100 µm.

5. A polymer laminate as claimed in claim 1, which has a total thickness of from 1 to 25 µm.

6. A polymer laminate as claimed in claim 1, wherein hydroxybenzoic acids, hydroxynaphthalenecarboxylic acids, hydroxybiphenylcarboxylic acids, hydroxycinnamic acids; 3- or 4-aminobenzoic acids; terephthalic acid, isophthalic acid, biphenyldicarboxylic acids, naphthalenedicarboxylic acids, cyclohexanedicarboxylic acids, pyridinedicarboxylic acids, oxybis(benzenecarboxylic acids), carboxycinnamic acids; hydroquinones, dihydroxybiphenyls, naphthalenediols, dihydroxydiphenyl sulfones, dihydroxydiphenyl ethers, dihydroxyterphenyls, dihydroxydiphenyl ketones, m- and p-phenylenediamine, diaminoanthraquinones, dihydroxyanthraquinones, m- or p-aminophenol; isosorbide, isomannide, isoiditol, camphoric acid, (D)- or (L)-methylpiperazine, (D)- or (L)-3-methyladipic acid, butane-2,3-diol, (−)2,3-O-isopropylidene-D-threitol or dimethyl (−)2,3-O-isopropylidene-L-tartrate, or a combination thereof, is present.

7. A polymer laminate as claimed in claim 1, wherein the light-absorbent layer consists of a colorant, a colored polymer, carbon black or graphite.

8. A polymer laminate as claimed in claim 1, wherein the light-absorbent layer is black.

9. A process for the production of a polymer laminate wherein the polymer laminate consists essentially of at least two cholesteric, liquid-crystalline polymer layers and a light-absorbent layer in between wherein the liquid-crystalline polymer of the liquid-crystalline polymer layers are main-chain polymers and the main-chain polymers consist of:

a) from 0 to 99.9 mol % of at least one compound selected from the group consisting of aromatic hydroxycarboxylic acids, cycloaliphatic hydroxycarboxylic acids and aromatic aminocarboxylic acids;

b) from 0 to 49.95 mol % of at least one compound selected from the group consisting of aromatic dicarboxylic acids and cycloaliphatic dicarboxylic acids;

c) from 0 to 49.95 mol % of at least one compound selected from the group consisting of aromatic diols, cycloaliphatic diols, aromatic diamines and aromatic hydroxyamines;

d) from 0.1 to 40 mol % of chiral, bifunctional comonomers, and e) from 0 to 5 mol % of a branchable component containing more than two functional groups, where the sum is 100 mol %;

comprising applying layers successively, optionally with interim drying or crosslinking, to a planar substrate, and detaching.

10. The process as claimed in claim 9, wherein a cholesteric, liquid-crystalline polymer dissolved in a solvent is applied to a planar substrate and dried, the light-absorbent layer is applied thereto, and, optionally after drying thereof, a further cholesteric, liquid-crystalline polymer dissolved in a solvent is applied thereto.

11. The process as claimed in 9, wherein a cholesteric, liquid-crystalline polymer, dissolved in a solvent, in which the particles forming the light-absorbent layer are dispersed is applied to a first polymer layer.

12. A process for the preparation of an effect pigment comprising the step of providing a polymer laminate as claimed in claim 1, as a starting material.

* * * * *